(12) United States Patent
Stein

(10) Patent No.: US 12,446,865 B2
(45) Date of Patent: Oct. 21, 2025

(54) SYSTEM AND METHOD FOR DETECTING PREGNANCY RELATED EVENTS

(71) Applicant: AVA AG, Zurich (CH)

(72) Inventor: Peter Stein, Zurich (CH)

( * ) Notice: Subject to any disclaimer, the term of this patent is extended or adjusted under 35 U.S.C. 154(b) by 1176 days.

(21) Appl. No.: 16/648,445

(22) PCT Filed: Sep. 11, 2018

(86) PCT No.: PCT/EP2018/074500
§ 371 (c)(1),
(2) Date: Mar. 18, 2020

(87) PCT Pub. No.: WO2019/057561
PCT Pub. Date: Mar. 28, 2019

(65) Prior Publication Data
US 2020/0222032 A1 Jul. 16, 2020

(30) Foreign Application Priority Data
Sep. 20, 2017 (CH) .................................... 01157/17

(51) Int. Cl.
*A61B 10/00* (2006.01)
*A61B 5/00* (2006.01)
(Continued)

(52) U.S. Cl.
CPC ...... *A61B 10/0012* (2013.01); *A61B 5/02405* (2013.01); *A61B 5/0816* (2013.01);
(Continued)

(58) Field of Classification Search
CPC ............ A61B 10/0012; A61B 5/02405; A61B 5/0816; A61B 5/681; A61B 2010/0016; A61B 2010/0019; A61B 2010/0029
See application file for complete search history.

(56) References Cited

U.S. PATENT DOCUMENTS

2013/0310704 A1* 11/2013 James .................. A61B 5/6801
600/549
2015/0241455 A1* 8/2015 Parsons .............. G01N 21/6486
422/68.1
(Continued)

FOREIGN PATENT DOCUMENTS

GB          2533774 A    7/2016
WO    WO 2015/143259 A1  9/2015
(Continued)

OTHER PUBLICATIONS

International Search Report and Written Opinion of the International Searching Authority for International Application No. PCT/EP2018/074500, dated Nov. 27, 2018, in 11 pages.

*Primary Examiner* — Amine Benlagsir

(57) ABSTRACT

An electronic system for detecting events related to a pregnancy of a female human, such as ovulation, conception, and miscarriage, comprises a wearable device (1) with a sensor system (100) worn in contact with the skin for measuring one or more physiological parameters. A processor (13, 30, 40) is configured to receive a user entry indicating a time of actual menses, and to determine time windows, for analyzing physiological parameters of the female human, using the time of actual menses. The processor is further configured to detect the pregnancy related events by comparing the physiological parameters, determined and recorded for a first time window, with those determined and recorded for a second time window, to indicate the pregnancy related events when defined detection criteria are met, and to use the user input for pregnancy related events to optimize the detection of these events with machine learning trained algorithms.

12 Claims, 12 Drawing Sheets

(51) Int. Cl.
　　　*A61B 5/024*　　　(2006.01)
　　　*A61B 5/08*　　　　(2006.01)
(52) U.S. Cl.
　　　CPC ...... *A61B 5/681* (2013.01); *A61B 2010/0016* (2013.01); *A61B 2010/0019* (2013.01); *A61B 2010/0029* (2013.01)

(56) References Cited

U.S. PATENT DOCUMENTS

| | | | | |
|---|---|---|---|---|
| 2016/0066894 | A1* | 3/2016 | Barton-Sweeney | A61B 10/0012 600/301 |
| 2016/0139156 | A1* | 5/2016 | Lakdawala | G01N 21/78 436/87 |
| 2017/0128052 | A1* | 5/2017 | Han | A61B 5/681 |
| 2018/0008239 | A1* | 1/2018 | McBean | A61B 5/4343 |
| 2019/0110692 | A1* | 4/2019 | Pardey | A61B 5/4325 |

FOREIGN PATENT DOCUMENTS

| | | |
|---|---|---|
| WO | WO 2015/150434 A1 | 10/2015 |
| WO | WO 2016/131630 A1 | 8/2016 |

\* cited by examiner

SYSTEM AND METHOD FOR DETECTING PREGNANCY RELATED EVENTS

CROSS-REFERENCE TO RELATED APPLICATIONS

This application is the U.S. National Phase under 35 U.S.C. § 371 of International Application PCT/EP2018/074500, filed Sep. 11, 2018, which claims priority to CH Application No. 01157/17, filed Sep. 20, 2017.

FIELD OF THE INVENTION

The present invention relates to an electronic system and a method for detecting events related to a pregnancy of a female human. Specifically, the present invention relates to an electronic system and a method for detecting pregnancy related events of a female human using a wearable device with sensor systems for measuring physiological parameters.

BACKGROUND OF THE INVENTION

The need for fertility treatments has risen strongly during the last decades. One reason for this is the increased age of women when giving birth for the first time, which is correlated with a decreased conception probability. The journey towards pregnancy includes a menstrual cycle with regular menstrual cycle events (i.e. menstruation and ovulation) and a successful conception as well as a healthy clinical pregnancy without a miscarriage.

The demand for monitoring this journey has increased. Available methods on the market are the temperature method for confirming ovulation and urinal tests for detecting the day of ovulation as well as a successful conception. Both options are perceived inconvenient by many users and cannot be used for the whole journey through pregnancy or reused.

Current wearable sensors are capable of capturing known pregnancy-associated physiological changes. The findings of clinical trials using the Ava Sensor Bracelet demonstrate that the monitoring of events on the journey to pregnancy can be continuously assessed with minimal effort from the user and consequently adds an innovative option for monitoring this process in a personal, clinical and scientific context.

SUMMARY OF THE INVENTION

It is an object of this invention to provide an electronic system and a method for detecting events related to a pregnancy of a female human, which system and method do not have at least some of the disadvantages of the prior art. In particular, it is an object of the present invention to provide an electronic system and a method for detecting ovulation, conception, and miscarriage of a female human.

According to the present invention, these objects are achieved through the features of the independent claims. In addition, further advantageous embodiments follow from the dependent claims and the description.

According to the present invention, the above-mentioned objects are particularly achieved in that an electronic system for detecting events related to a pregnancy of a female human, the pregnancy related events comprising ovulation, conception, and/or miscarriage, comprises a wearable device which includes a sensor system configured to be worn in contact with the skin of the female human and to measure one or more physiological parameters of the female human. The electronic system further comprises a processor configured to receive from the female human an entry which indicates a time of an actual menses of a first cycle, and to determine time windows, for analyzing physiological parameters of the female human, using the time of the actual menses. The processor is further configured to detect the pregnancy related events by comparing the physiological parameters of the female human, determined and recorded for a first one of the time windows, with the physiological parameters of the female human, determined and recorded for a second one of the time windows, and to indicate to the female human the pregnancy related events when the result of the comparing of the physiological parameters meets defined detection criteria.

In an embodiment, the processor is further configured to receive from the female human an entry which indicates an actual occurrence of one of the pregnancy related events for the female human, and to adapt the defined detection criteria for the pregnancy related event indicated by the female human, using the physiological parameters determined and recorded for the female human.

In an embodiment, the processor is further configured to calculate average values of the physiological parameters of the female human, determined and recorded for the first one of the time windows and for the second one of the time windows, and to compare the average values of the physiological parameters calculated for the first one of the time windows to the average values of the physiological parameters calculated for the second one of the time windows.

In an embodiment, the processor is further configured to determine a breathing rate of the female human, a heart rate of the female human, a skin temperature of the female human, a heart rate variability (HRV) parameter of the female human, and/or a perfusion of the female human. The processor is configured to detect the pregnancy related events by comparing a breathing rate of the female human, a heart rate of the female human, a skin temperature of the female human, a heart rate variability (HRV) parameter of the female human, and/or a perfusion of the female human, determined and recorded for the first one of the time windows, respectively with a breathing rate of the female human, a heart rate of the female human, a skin temperature of the female human, a heart rate variability (HRV) parameter of the female human, a skin bioimpedance of the female human, and/or a perfusion of the female human, determined and recorded for the second one of the time windows, and to indicate to the female human the pregnancy related events when the result of the comparing meets defined detection criteria.

In an embodiment, the processor is further configured to use the time of the actual menses, indicative of a first cycle, to determine a time for a subsequent second cycle following the first cycle, and to detect the pregnancy related events by comparing the physiological parameters of the female human, determined and recorded for the first one of the time windows in the first cycle, with the physiological parameters of the female human, determined and recorded for the second one of the time windows in the second in cycle, and to indicate to the female human the pregnancy related events when the result of the comparing of the physiological parameters meets defined detection criteria.

In an embodiment, the processor is further configured to detect occurrence of the conception and to indicate to the female human a pregnancy status when a first set of the physiological parameters of the female human, determined and recorded in the second one of the time windows in a final phase of the second cycle, has a higher value than the first set of the physiological parameters of the female human, determined and recorded in the first one of the time windows in the final phase of the first cycle, by a defined threshold value. The first set of the physiological parameters of the female human includes the breathing rate of the female human, the heart rate of the female human, and/or the skin temperature of the female human.

In an embodiment, the processor is further configured to detect occurrence of the conception and to indicate to the female human a pregnancy status when a second set of the physiological parameters of the female human, determined and recorded in the second one of the time windows in a final phase of the second cycle, has a lower value than the second set of the physiological parameters of the female human, determined and recorded in the first one of the time windows in the final phase of the first cycle, by a defined threshold value. The second set of the physiological parameters of the female human includes a low frequency component of a heart rate variability of the female human, a heart rate variability ratio of the female human, and/or a perfusion of the female human.

In an embodiment, the processor is further configured to set a starting time of the first one of the time windows in the final phase of the first cycle to ten days after ovulation in the first cycle, and to set a starting time of the second one of the time windows in the final phase of the second cycle to ten days after ovulation in the second cycle.

In an embodiment, the processor is further configured to detect the miscarriage and to indicate to the female human the miscarriage when a third set of the physiological parameters of the female human, determined and recorded in the second one of the time windows, after detection of an occurrence of the conception, shows a decreasing value by a defined threshold value from the third set of the physiological parameters of the female human, determined and recorded in the first one of the time windows preceding the consecutive second one of the time windows. The third set of the physiological parameters of the female human includes the heart rate of the female human and/or the skin temperature of the female human.

In an embodiment, the processor is further configured to detect an ovulatory cycle and to indicate to the female human the ovulatory cycle when a fourth set of the physiological parameters of the female human, determined and recorded in the second one of the time windows in a final phase of a current cycle, shows a variation to the respective physiological parameters, determined and recorded in the current cycle for the first one of the time windows preceding the second one of the time windows in the final phase, which variation is greater by a defined threshold than the variation expected for an anovulatory cycle. The fourth set of the physiological parameters of the female human including the heart rate of the female human, a standard deviation of beat to beat heart rate variability, a heart rate variability ratio (HRV), another HRV parameter, and the skin temperature.

In an embodiment, the processor is further configured to determine an expected menstruation and to indicate to the female human the expected menstruation, when a fifth set of the physiological parameters of the female human, determined and recorded in the second one of the time windows in a non-conceptive cycle, shows defined deviation from values of the fifth set of the physiological parameters of the female human, determined and recorded in the first one of the time windows preceding the second one of the time windows of the non-conceptive cycle. The fifth set of the physiological parameters of the female human and the respective defined deviation include the heart rate of the female human showing a decreasing value, a perfusion of the female human showing a decreasing value, the skin temperature showing a decreasing value, a breathing rate of the female human showing an increasing value, a heart rate variability ratio of the female human showing an increasing value, and/or a bio-impedance of the female human showing an increasing value.

In an embodiment, the electronic system further comprises a data store, and the processor is configured to store the one or more physiological parameters measured by the second sensor system, and to detect the pregnancy related events, using the one or more physiological parameters of the female human stored during a plurality of cycles.

In an embodiment, the processor is arranged in the wearable device and configured to detect the pregnancy related events, using physiological parameters measured by the sensor system of the wearable device.

In an embodiment, the processor is arranged in an external system, separated from the wearable device, the wearable device further comprises a communication module configured to transmit physiological parameters measured by the sensor system of the wearable device to the external system, and the processor is configured to detect the pregnancy related events using the physiological parameters received from the wearable device.

In addition to the electronic system, the present invention also relates to a method of detecting events related to a pregnancy of a female human, the pregnancy related events comprising ovulation, conception, and/or miscarriage. The method comprises receiving in a processor from a sensor system of a wearable device one or more physiological parameters of the female human; receiving in the processor from the female human an entry indicating a time of an actual menses of a first cycle; determining, by the processor, time windows, for analyzing physiological parameters of the female human, using the time of the actual menses; detecting the pregnancy related events by the processor comparing the physiological parameters of the female human, determined and recorded for a first one of the time windows, with the physiological parameters of the female human, determined and recorded for a second one of the time windows; and indicating, by the processor, to the female human the pregnancy related events when comparing the physiological parameters meets defined detection criteria.

In addition to an electronic system and a method of detecting events related to a pregnancy of a female human, the present invention also relates to a computer program product comprising a non-transient computer-readable medium having stored thereon computer program code configured to control one or more processors of a computerized system. The computer program code is configured to control the one or more processors such that the computerized system performs the steps of: receiving from a sensor system of a wearable device one or more physiological parameters of a female human; receiving from the female human an entry indicating a time of an actual menses of a first cycle; determining time windows, for analyzing physiological parameters of the female human, using the time of the actual menses; detecting one or more pregnancy related events by comparing the physiological parameters of the female human, determined and recorded for a first one of the time windows, with the physiological parameters of the female human, determined and recorded for a second one of the time windows, the pregnancy related events comprising at least one of: ovulation, conception, and miscarriage; and indicating to the female human the pregnancy related events when comparing the physiological parameters meets defined detection criteria.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
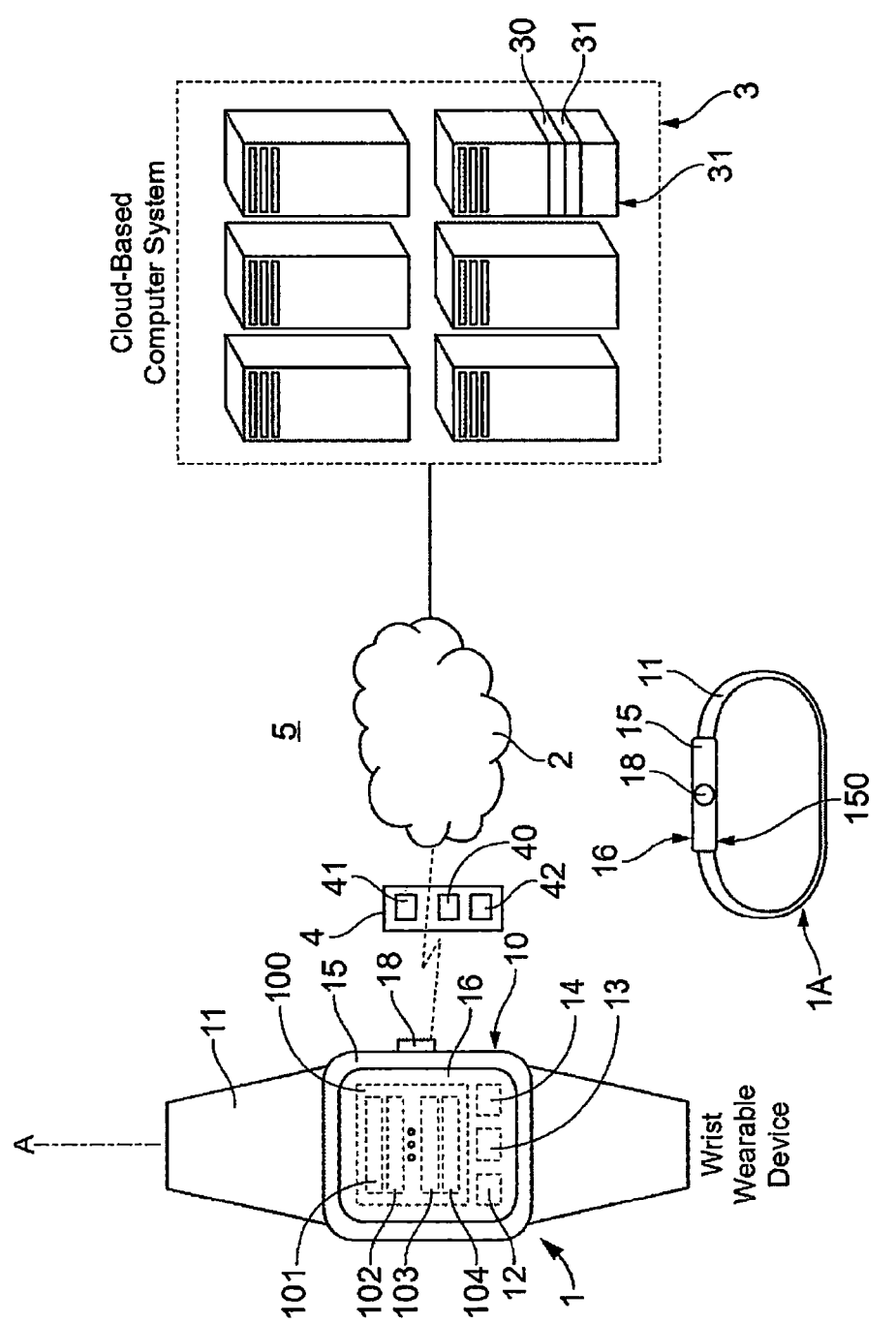
FIG. 1: shows a block diagram illustrating schematically an electronic system for detecting events related to a pregnancy of a female human, the system comprising a wearable device with a processor in the wearable device and/or an external system.

FIG. 1 shows an electronic system 5 for detecting events related to a pregnancy of a female human. The electronic system 5 comprises a wearable device 1 and a processor 13, 30, 40 in the wearable device 1 and/or in an external system.

In FIG. 1, reference numeral 3 refers to a computer system, e.g. a cloud-based computer system, comprising one or more computers 31 with one or more processors 30 and a data storage system 31. The computer system 3 or its processors 30, respectively, are connected to the data storage system 31 and configured to execute various functions, as will be explained later in more detail. The data storage system 31 comprises RAM, flash memory, hard disks, data memory, and/or other data stores.

In FIG. 1, reference numeral 4 refers to a mobile communication device, e.g. a cellular telephone or a tablet or laptop computer, comprising one or more processors 40, a data store 41, and data entry elements 42. The processors 40 are connected to the data store and configured to execute various functions, as will be explained later in more detail. The data store comprises RAM, flash memory, data memory, and/or other data storage systems. The data entry elements 42 comprise one or more keys, a keyboard, and/or a touch sensitive screen enabling the user to enter data and/or event indications.

In FIG. 1, reference numeral 1 refers to a wearable device, e.g. a wrist wearable device, specifically a wrist wearable electronic device. Reference numeral 1A refers to a cross-sectional view of the wearable device 1 along central axis A. The wearable device 1 includes a fixation system for attaching the wearable device 1 on the body of a user, specifically, for attaching the wearable device 1 in contact with the skin of the user; in the embodiment shown in FIG. 1, the wearable device 1 comprises a wrist band 11 and a device body 10 attached to or integrated in the wrist band 11. The wristband 11 is implemented as a watchstrap, a watchband, a bracelet, or the like. The device body 10 comprises a housing 15 and an optional display 16 integrated in the housing 15.

As illustrated schematically in FIG. 1, wearable device 1 comprises several sensor systems 100, including a sensor system 101 with optical sensors 101 configured to generate photoplethysmography (PPG) signals for measuring heart rate, heart rate variability, perfusion, and breathing rate. For example, sensor system 101 comprises a PPG-based sensor system for measuring heart rate and heart rate variability as described in Simon Arberet et al., "Photoplethysmography-Based Ambulatory Heartbeat Monitoring Embedded into a Dedicated Bracelet", Computing in Cardiology 2013; 40:935-938, included herewith by reference in its entirety.

In an embodiment, the sensor systems 100 further include a sensor system 102 with one or more accelerometers for measuring body movements (acceleration). In an embodiment, for the purpose of sleep phase analysis the accelerometers are implemented in combination with the PPG-based sensor system, as described in Philippe Renevey et al., "PHOTOPLETHYSMOGRAPHY-BASED BRACELET FOR AUTOMATIC SLEEP STAGES CLASSIFICATION: PRELIMINARY RESULTS", IASTED 2014, Zurich, Switzerland, included herewith by reference in its entirety.

The sensor systems 100 further include a temperature sensor system 104 for measuring the user's temperature; specifically, the user's skin temperature; more specifically, the wrist's skin temperature. The temperature sensor system 104 comprises one or more sensors, including at least one temperature sensor and in an embodiment one or more additional sensor(s) for measuring further parameters like perfusion, bio-impedance and/or heat loss for determining the user's temperature.

Depending on the embodiment, the sensor systems 100 further include a bioimpedance sensor system 103 with an electrical impedance or conductance measuring system.

The optical sensors 101, the bioimpedance sensor system 103, and the temperature sensor system 104 are integrated in the housing 15 of the wearable device 1 and are arranged on a rear side 150 of the wearable device 1, e.g. opposite of the optional display 16, facing the user's skin in a mounted state of the wearable device 1. In the mounted state when the device 1 is actually attached and worn, e.g. on the wrist, just as one would wear a watch, the rear side 150 of the wearable device 1 or the rear side 150 of its housing 15, respectively, is in contact with the skin, e.g. the skin of the wrist, i.e. the optical sensors 101, the bioimpedance system 103, and the temperature sensor system 104 touch the skin or at least face the skin, e.g. the skin of the wrist.

The wearable device 1 further comprises a data store 12, e.g. data memory such as RAM or flush memory, and an operational processor 13 connected to the data store 12 and the sensor systems 100. The processor 13 comprises an electronic circuit configured to perform various functions that will be described later in more detail.

As illustrated in FIG. 1, in an embodiment, the wearable device 1 further comprises a communication module 14 connected to the processor 13. The communication module 14 is configured for data communication with an external system 3, 4, that is separated from the wearable device 1, i.e. a computerized system that is arranged in a different housing than the wearable device 1. Depending on the embodiment and/or configuration, the external system is a remote computer system 3 or a mobile communication device 4. Accordingly, the communication module 14 is configured for data communication with the remote computer system 3 via a network 2 and/or with the mobile communication device 4 via a close range communication interface. The network 2 comprises a mobile radio network such as a GSM-network (Global System for Mobile communication), a UMTS-network (Universal Mobile Telephone System), or another mobile radio telephone system, a wireless local area network (WLAN), and/or the Internet. For example, for close range communication, the communication module 14 comprises a Bluetooth communication module, e.g. a Low Energy Bluetooth module, or another close range communication module configured for direct data communication with the external mobile communication device 4. In an alternative embodiment, the mobile communication device 4 is configured to facilitate the data communication between the wearable device 1 and the remote computer system 3, e.g. by relaying the measurement data from the wearable device 1 via the network 2 to the remote computer system 3, for processing. Although not illustrated, the wearable device 1 further comprises a timer module configured to generate current time and date information, e.g. a clock circuit or a programmed timer module. The timer module is further configured to generate time stamps including the current time and date.

As further illustrated in FIG. 1, the wearable device 1 further comprises one or more data entry elements 18 enabling the user to enter data and/or event indications. Depending on the embodiments, data entry elements 18 comprise data entry buttons, keys and/or rotary selection switches.

Figure 2:
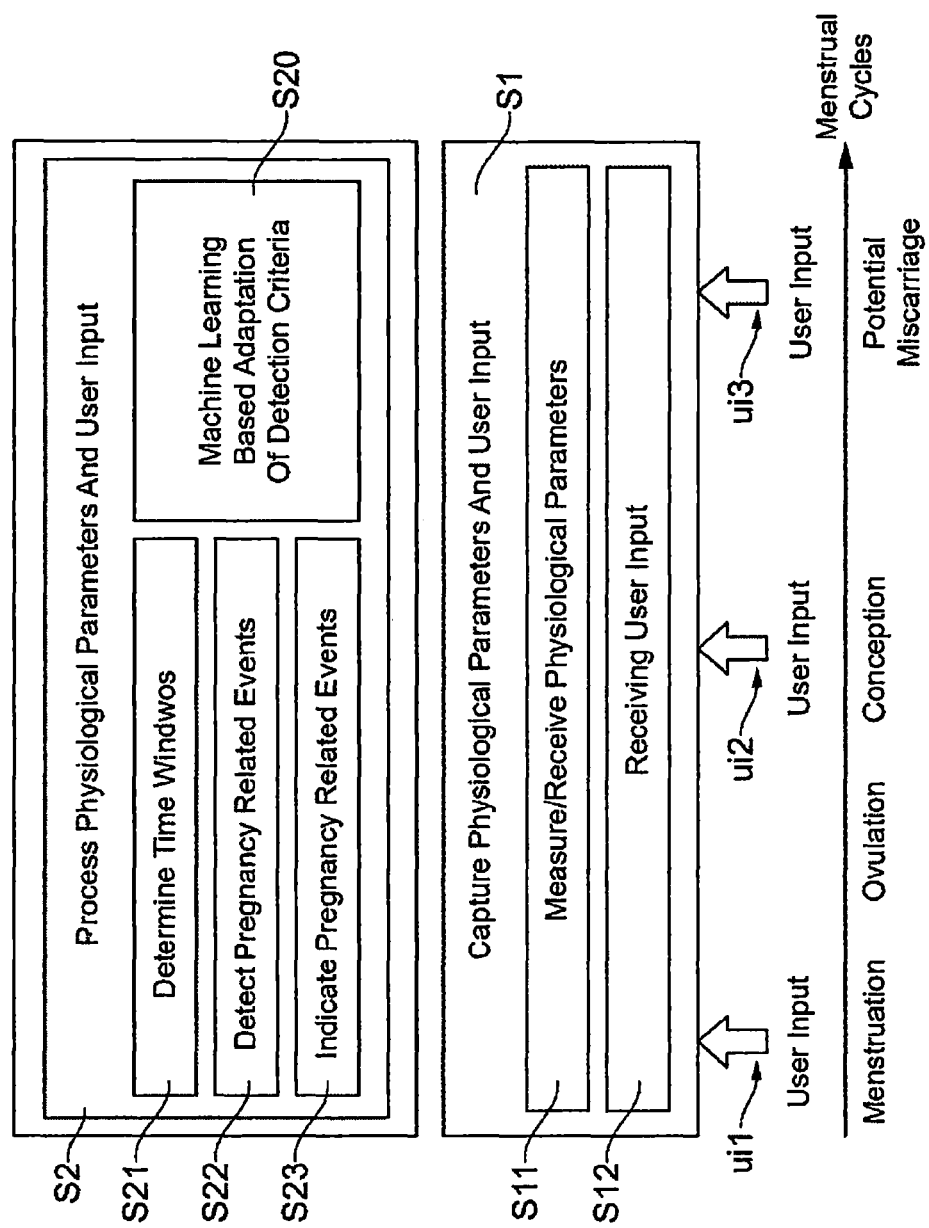
FIG. 2: shows a block diagram illustrating schematically an exemplary overview of steps for detecting events related to a pregnancy of a female human.
Figure 3:
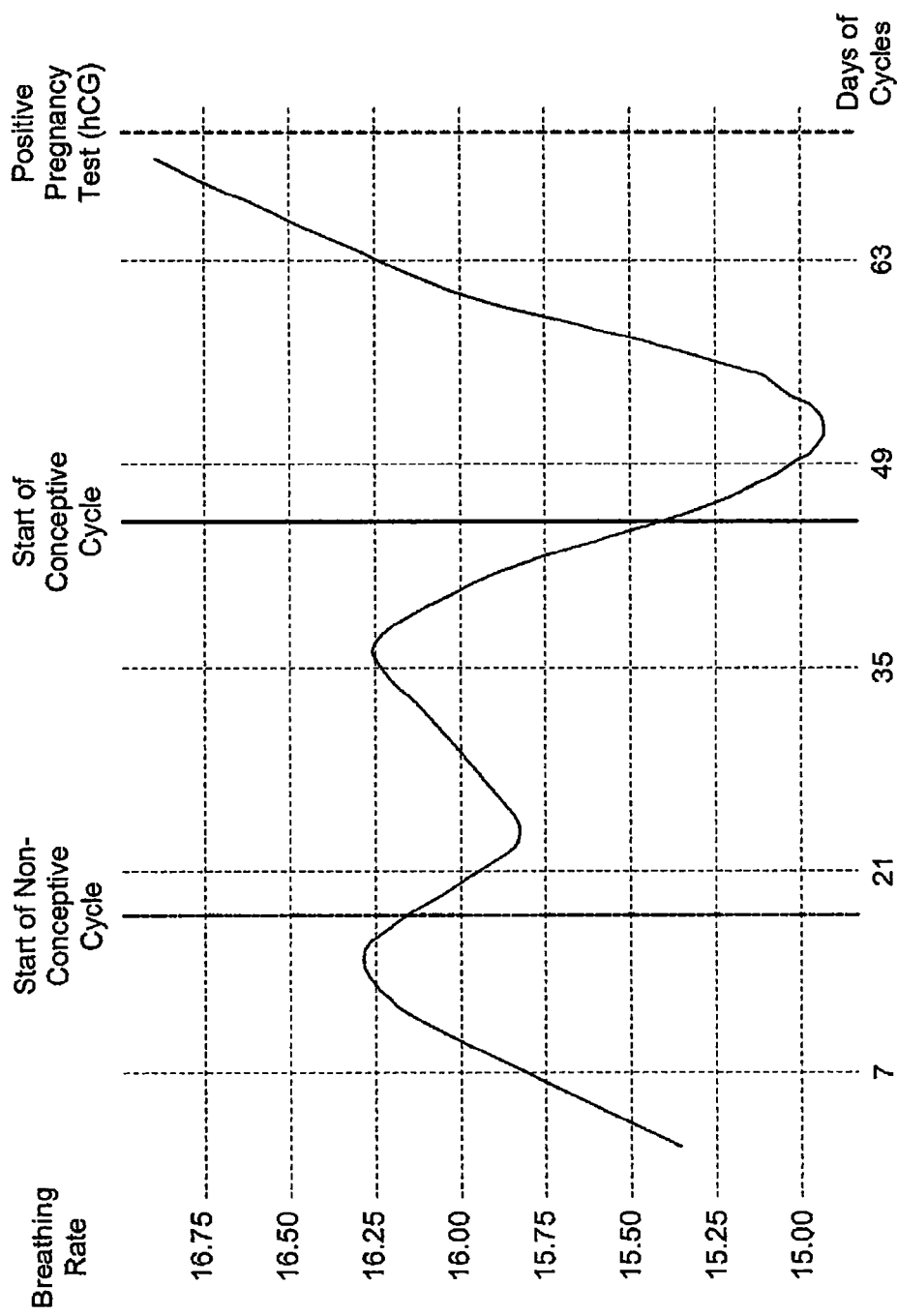
FIG. 3: shows a graph illustrating an example of the temporal course and change of the breathing rate of a female human during a non-conceptive cycle and a subsequent conceptive cycle.
Figure 4:
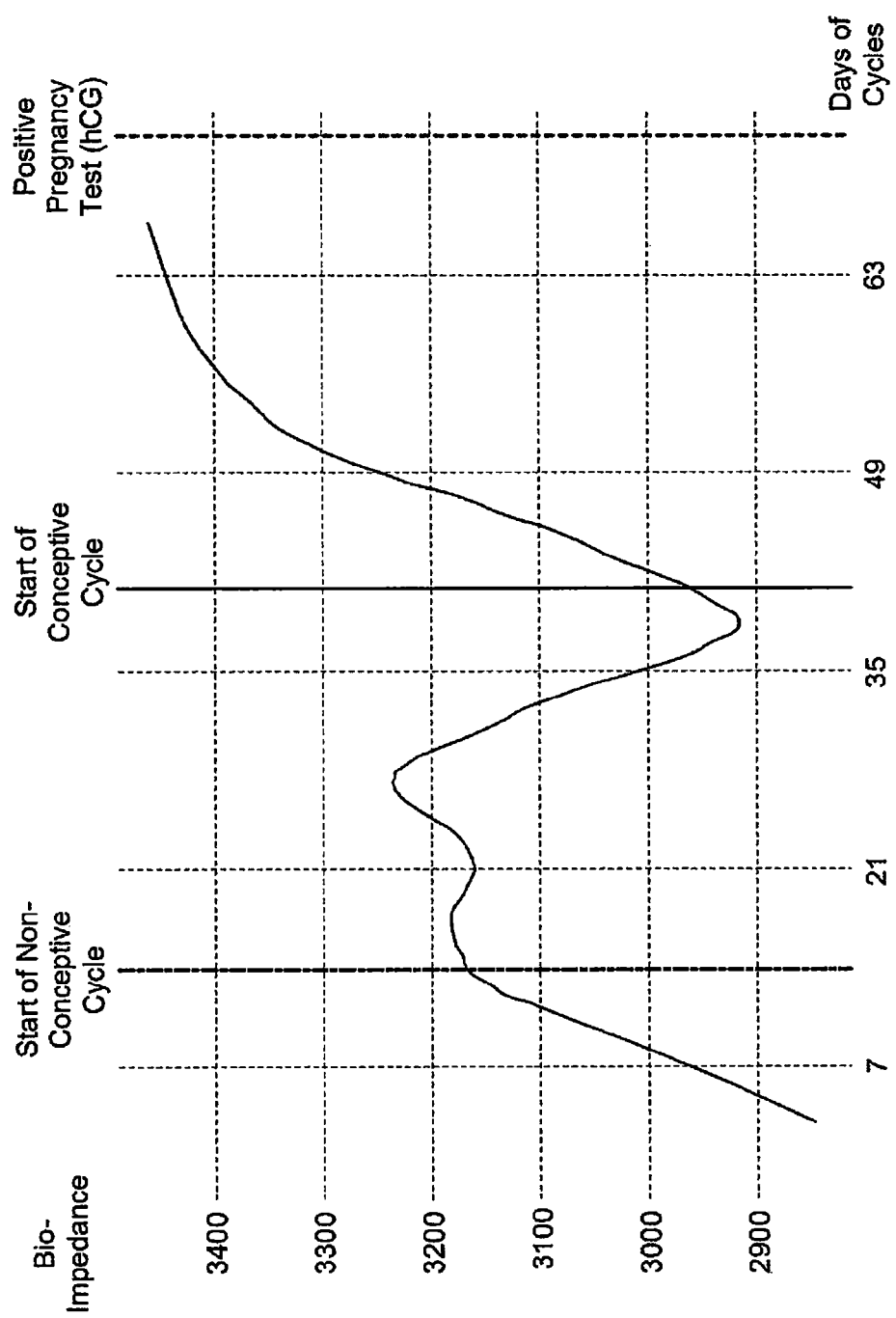
FIG. 4: shows a graph illustrating an example of the temporal course and change of the bio-impedance of a female human during a non-conceptive cycle and a subsequent conceptive cycle.
Figure 5:
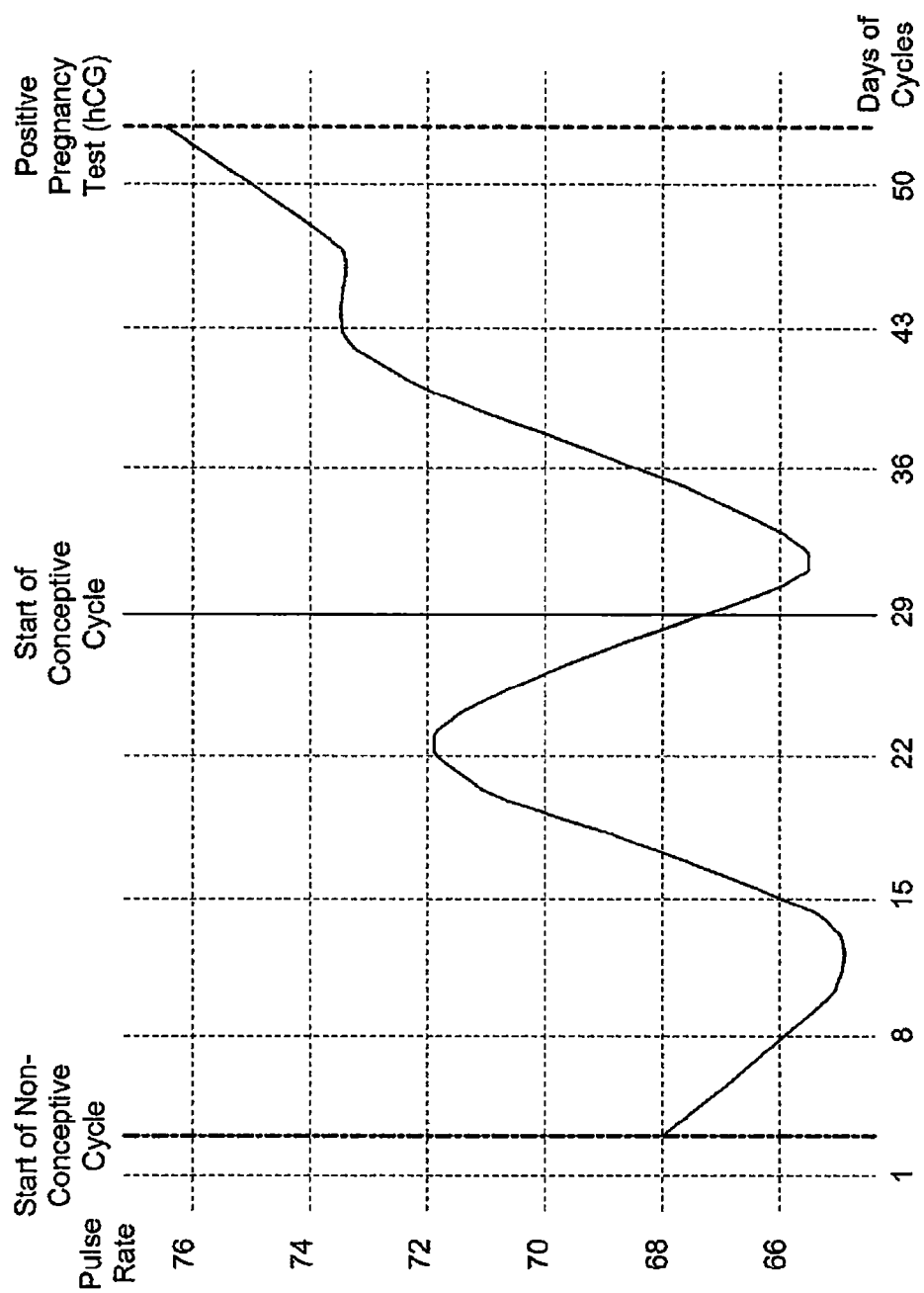
FIG. 5: shows a graph illustrating an example of the temporal course and change of the pulse (heart) rate of a female human during a non-conceptive cycle and a subsequent conceptive cycle.
Figure 6:
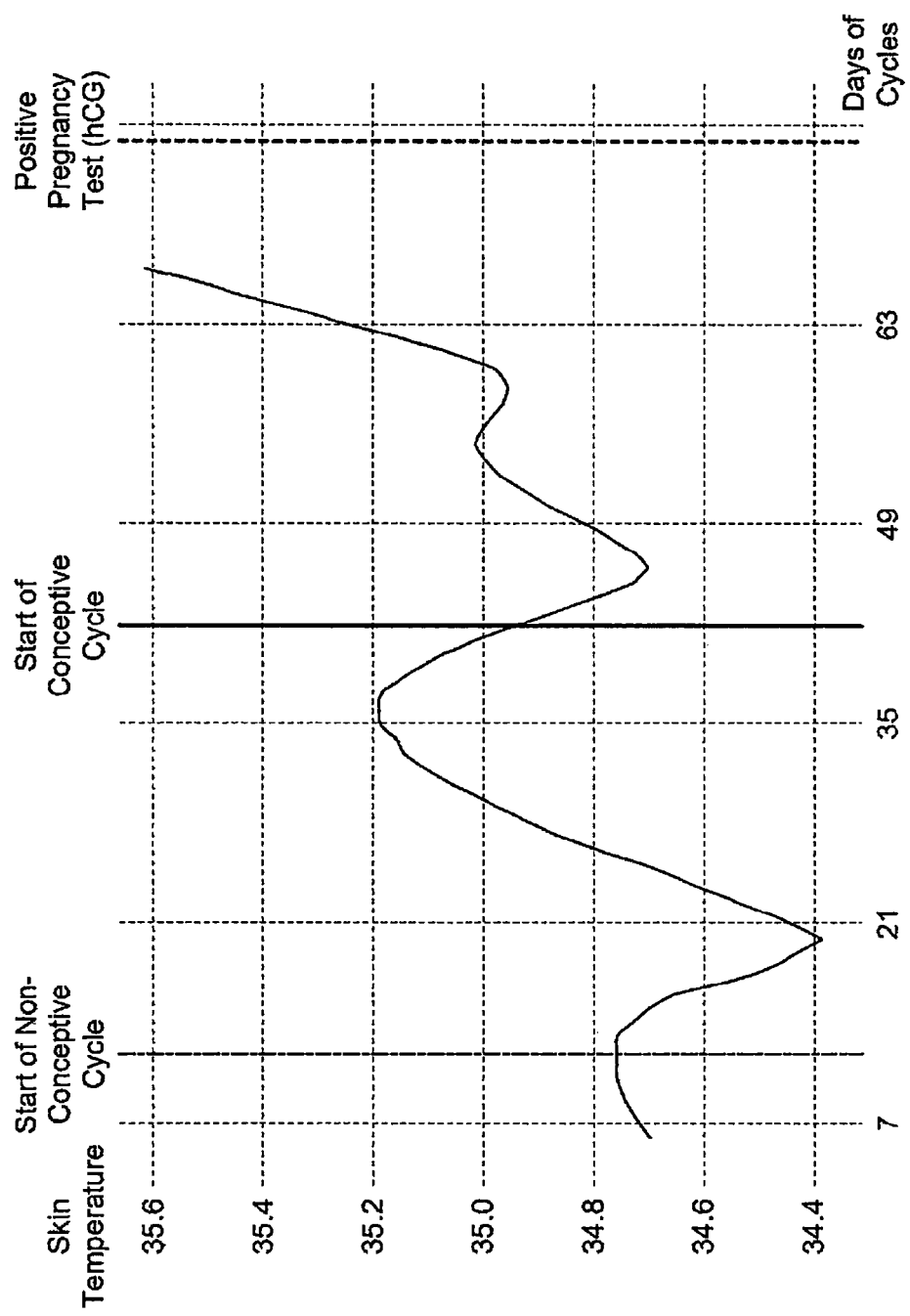
FIG. 6: shows a graph illustrating an example of the temporal course and change of the skin temperature of a female human during a non-conceptive cycle and a subsequent conceptive cycle.

As illustrated schematically in FIG. 2, the time line of menstrual cycles defined by a sequence of menstruation and ovulation may comprise pregnancy related events following ovulation. Specifically, in addition to ovulation, conception and miscarriage are considered pregnancy related events.

FIG. 2 further illustrates an overview of steps, executed by the processor 13 of the wearable device 1 and/or the processor(s) 30, 40 of the computer system 3 and/or the mobile communication device 4, for detecting events related to the pregnancy of a female human also referred to as female user.

Step S1 is executed on an ongoing basis and comprises the capturing of physiological parameters and user input used for detecting pregnancy related events for a female user.

In step S11, the wearable device 1 or its sensor systems 100, respectively, measure the physiological parameters of the female user which are used for detecting the pregnancy related events, as described later with reference to FIGS. 3 to 15. The processor 13 stores the measurement values in the data store 12 together with a time stamp, including the current time and date.

In step S12, the wearable device 1 or the mobile communication device 4 receives user input entered by the female using data entry elements 18 of the wearable device 1 or data entry elements 42 of the mobile communication device 4, respectively. Reference numeral ui1 refers to user input related to and indicative of the time of actual menstruation of the female user, e.g. the day when menstruation starts or started.

Reference numeral ui2 refers to user input related to and indicative of actual conception of the female user, as indicated or established by a positive pregnancy test. Reference numeral ui3 refers to user input related to and indicative of an actual miscarriage suffered by the female user. The user input is stored by processor 13 or 40 in the data store 12 or 41, respectively, together with a time stamp, including the current time and date.

In step S2, the captured physiological parameters and user input of the female user are processed to detect pregnancy related events for the female user. Depending on the embodiment and/or configuration, the processing of the measured physiologic parameters and recorded user input of the female user is performed by the processor 13 of the wearable device 1 and/or by the processor(s) 30, 40 of the computer system 3 and/or the mobile communication device 4. Thus, the processor 13 of the wearable device and/or the processor(s) 30, 40 of the computer system 3 and/or the mobile communication device 4 receive one or more physiological parameters of the female human from the sensor system 100 of the wearable device 1 and the user input. In the case, involving processing by the processor(s) 30 of the computer system 3, the time stamped values of the physiological parameters and user input are transmitted by the communication module 14 from the wearable device 1 via network 2 to the computer system 3, e.g. directly or via the mobile communication device 4 as a relay device. In the case, involving processing by the processor 40 of the mobile communication device 4, the physiological parameters and user input are transmitted by the communication module 14 from the wearable device 1 via the close range communication interface to the mobile communication device 4 where they are stored in the data store 41. In the computer system 3 and/or the mobile communication device 4, respectively, the measurement values and user input are received and stored securely assigned to the female user, defined, for example, by a user identifier and/or a device identifier (for increased anonymity/privacy). Transmission of the time stamped measurements and user input is performed periodically, for example; typically, the time stamped data is transmitted less frequently than the measurements are taken, e.g. various time stamped measurement samples, taken at different times, are grouped and transmitted together by the wearable device 1 in a combined data transmission.

In step S21, the processor 13 of the wearable device and/or the processor(s) 30, 40 of the computer system 3 and/or the mobile communication device 4 determine time windows for analyzing physiological parameters of the female user to detect pregnancy related events. For determining these time windows, based on the time of menstruation indicated by the female user, the subsequent cycle is determined, e.g. the estimated start of the cycle following the preceding cycle defined by the time of menstruation. Specifically, the start of the subsequent cycle is calculated from the start of the menses of the preceding cycle by adding the average duration of the cycle length of the female user to the start of the indicated actual menses. Initially, the average duration of cycle length for a female user is set to 28 days, if not differently specified by the user initially. The determined start of the subsequent (next) cycle also establishes the end of the preceding (current) cycle. Depending on the embodiment and configuration, the time windows used for analyzing the physiological parameters of the female user and detecting pregnancy related events include fixed time windows and sliding time windows.

For time windows which are ovulation related, the time of ovulation is determined by the processor 13 of the wearable device and/or the processor(s) 30, 40 of the computer system 3 and/or the mobile communication device 4 as described in WO2016/131630, for example, by determining the time when the temperature of the female user exceeds a defined lower temperature threshold $TT_{low}$, e.g. a defined percentage v<110%, e.g. v=102%, of the minimum temperature levels $T_{min}$ of the temperature recorded on average for the particular female user, during a plurality n of menstrual cycles $$TT_{low} = v \cdot \left( \frac{1}{n} \sum_n T_{min_n} \right),$$

or by another known method.

Figure 12:
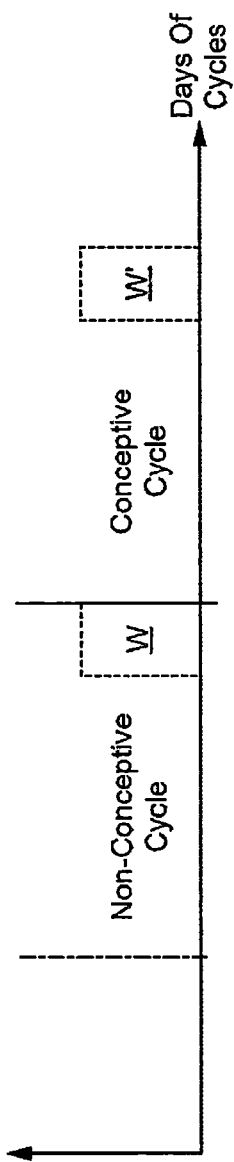
FIG. 12: shows a graph illustrating time windows for the final phases of a cycle, i.e. the late post-ovulatory phase or late luteal phase of a cycle, for detecting conception, i.e. pregnancy.
Figure 14:
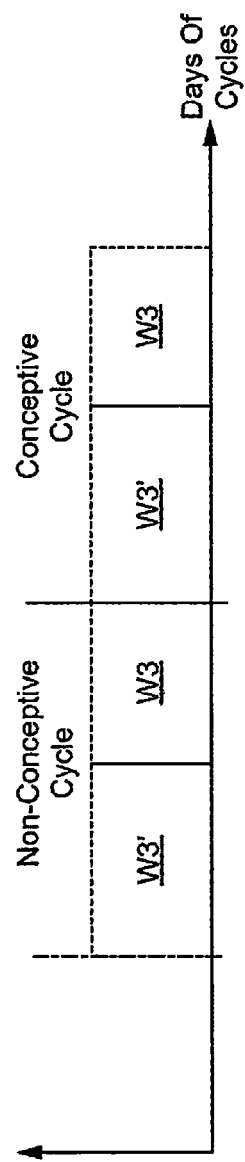
FIG. 14: shows a graph illustrating time windows for the final phase of a cycle and the (preceding) other days of the cycle for detecting an anovulatory cycle.

The fixed time windows include time windows W, W' for the late final phase of a cycle, i.e. the late post-ovulatory phase or late luteal phase, respectively, for detecting conception, i.e. pregnancy, starting later than ten days after ovulation and ending at the end of a cycle, as illustrated in FIG. 12. The time windows W, W' for the late final phase of a cycle are calculated based on the time of ovulation of the respective cycle, or alternatively, based on the end of the respective cycle. The fixed time windows further include time windows W3, W3' for a final phase of a cycle, e.g. a time window W3 for the last thirteen days of a cycle, and a time window W3' for the (preceding) other days of the cycle, respectively, for detecting anovulatory cycles, as illustrated in FIG. 14. The time window W3 for the final phase, e.g. the last thirteen days, of a cycle are calculated based on end of the respective cycle.

Figure 13:
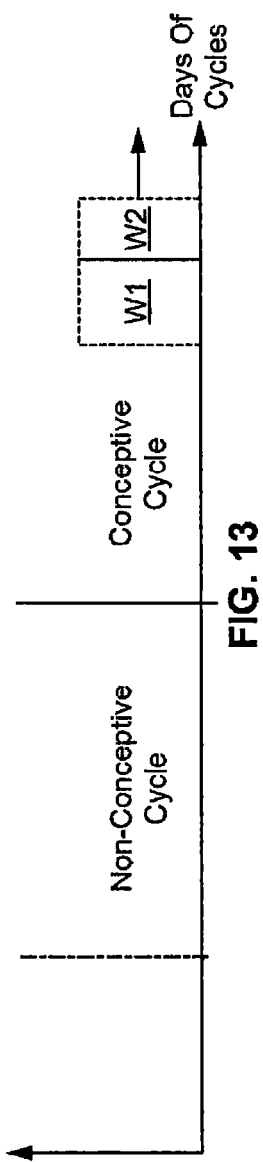
FIG. 13: shows a graph illustrating a set of consecutive sliding time windows for detecting a miscarriage in a conceptive cycle.
Figure 15:
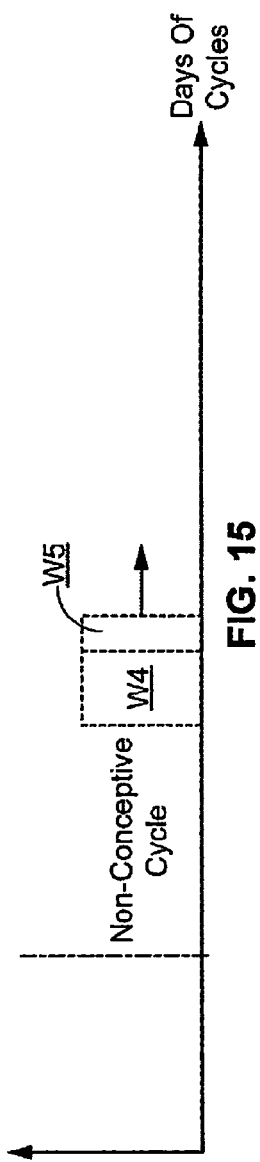
FIG. 15: shows a graph illustrating a set of consecutive sliding time windows for predicting menstruation in a non-conceptive cycle.

The sliding time windows include a set of consecutive time windows W1, W2, used in a pregnancy for detecting a miscarriage, with an approximate duration of seven days for the earlier, preceding time window W1, and five days for the subsequent, later time window W2, as illustrated in FIG. 13. The calculation of these time windows is activated after conception was detected or the user gave the input of a positive pregnancy test. The sliding time windows further include a set of consecutive time windows W4, W5, used in a non-conceptive cycle for predicting menstruation, with an approximate duration of four days for the earlier, preceding time window W4 (three to six days before menstruation), and two days for the subsequent, later time window W5 (one to two days before menstruation), as illustrated in FIG. 15. The calculation of these time windows is activated after ovulation was detected or confirmed based on the physiological signals.

In step S22, the processor 13 of the wearable device and/or the processor(s) 30, 40 of the computer system 3 and/or the mobile communication device 4 detect pregnancy related events for the female user, by analyzing the physiological parameters of the female user and applying detection criteria and threshold values described below in more detail. In an embodiment, in addition to the pregnancy related events, the processor 13 of the wearable device and/or the processor(s) 30, 40 of the computer system 3 and/or the mobile communication device 4 further determine an expected menstruation in a non-conceptive cycle.

In step S23, a detected pregnancy related event or the expected next menses, if applicable, is indicated to the user on a user interface of the wearable device 1 or the mobile communication device 4 by the processor 13 or 40, respectively, e.g. as an acoustical signal and/or a graphical representation on the display 16. Depending on the embodiment, the detected pregnancy related event or the expected time of the next menses, if applicable, is transmitted by the processor(s) 30 of the computer system 3 via network 2 to the wearable device 1 and/or the mobile communication device 4.

In step S20, the processor 13 of the wearable device and/or the processor(s) 30, 40 of the computer system 3 and/or the mobile communication device 4 use the user input ui1, ui2, ui3 to continuously improve the detection of pregnancy related events, by adapting the detection criteria in response to the received user input ui1, ui2, ui3 which is related to the actual occurrence of pregnancy related events, employing machine learning algorithms including but not limited to Recurrent Neural Networks, Random Forest Classifiers and Hidden Markov Models and Support Vector Machines.

In the following paragraphs, described with reference to FIGS. 3-15 are specific embodiments and examples of the processor 13 of the wearable device and/or the processor(s) 30, 40 of the computer system 3 and/or the mobile communication device 4 using one or more of the recorded physiological parameters and user input of a female user for detecting the pregnancy related events and indicating the expected next menses.

As illustrated in FIGS. 3-9, the course of the temporal change of breathing rate, bio-impedance, pulse rate (heart rate), low frequency component of the heart rate variability, heart rate variability ratio, perfusion and skin temperature of a female human during a non-conceptive cycle differs noticeably from the course of the temporal change of these physiological parameters during a (subsequent) conceptive cycle. These differences are particularly detectable between the course of the physiological parameters in the late luteal phase (later than ten days after ovulation) of the non-conceptive cycle and the corresponding late post-ovulatory phase in the conceptive cycle (time windows W, W').

Table 1 indicates these difference in absolute values for the breathing rate, pulse rate (heart rate), low frequency component of the heart rate variability, heart rate variability ratio, perfusion, and skin temperature together with the respective standard deviation (* significance p<0.01).

TABLE 1

| Physiological parameters | Difference in late luteal phase of non-conceptive cycle and corresponding late post-ovulatory phase in conceptive cycle | Standard deviation |
|---|---|---|
| Breathing rate [breaths per minute] | 0.900* | (0.105) |
| Pulse rate [beats per minute] | 5.070* | (0.534) |
| Heart Rate Variability (HRV) Low Frequency (LF) [ms$^2$] | −167.530* | (50.461) |
| HRV Ratio (LF/HF) [—] | −0.169* | (0.044) |
| Perfusion [—] | −22.639* | (4.580) |
| Skin temperature [° C.] | 0.348* | (0.067) |

As illustrated in FIGS. 3-6, for a first set of physiological parameters, including the breathing rate, the pulse (heart) rate, the bioimpedance and the skin temperature, these difference are characterized by an increased value in the late final phase, i.e. the late post-ovulatory phase, in the conceptive cycle (indicated by time window W' in FIG. 12), compared to the corresponding late final phase, i.e. the late luteal phase, of a non-conceptive cycle (indicated by time window W in FIG. 12).

Figure 7:
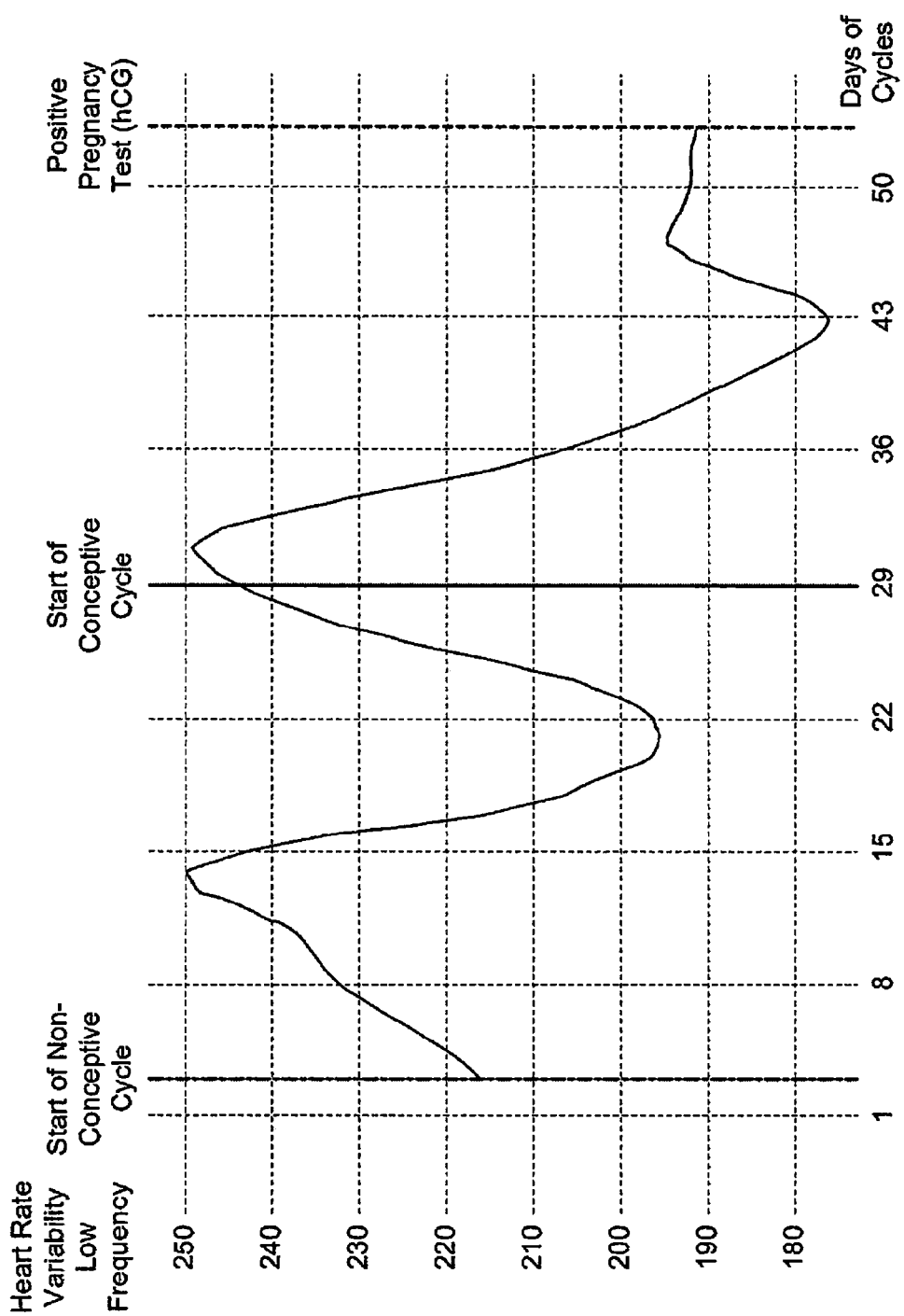
FIG. 7: shows a graph illustrating an example of the temporal course and change of the low frequency component of the heart rate variability of a female human during a non-conceptive cycle and a subsequent conceptive cycle.
Figure 8:
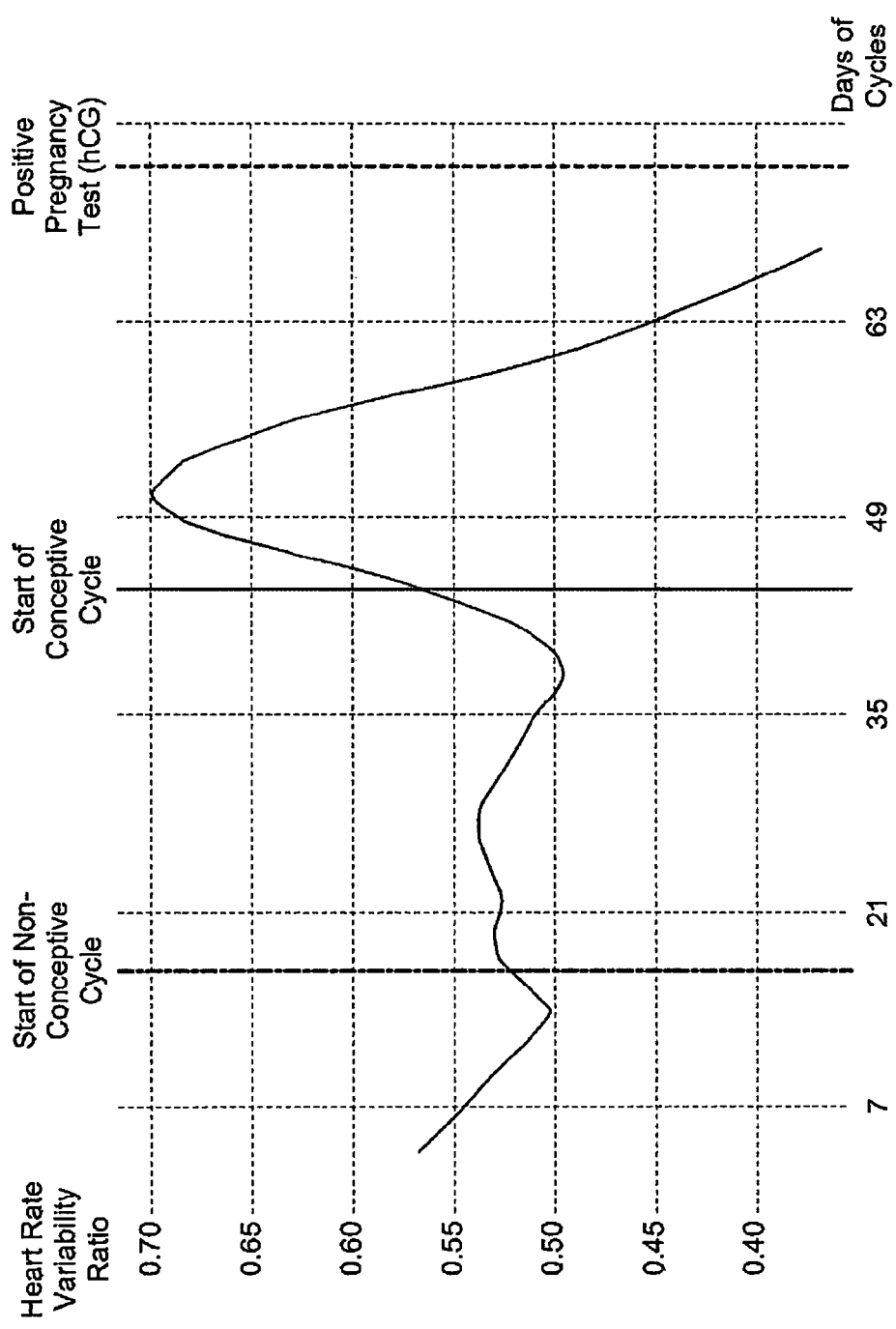
FIG. 8: shows a graph illustrating an example of the temporal course and change of the heart rate variability ratio of a female human during a non-conceptive cycle and a subsequent conceptive cycle.
Figure 9:
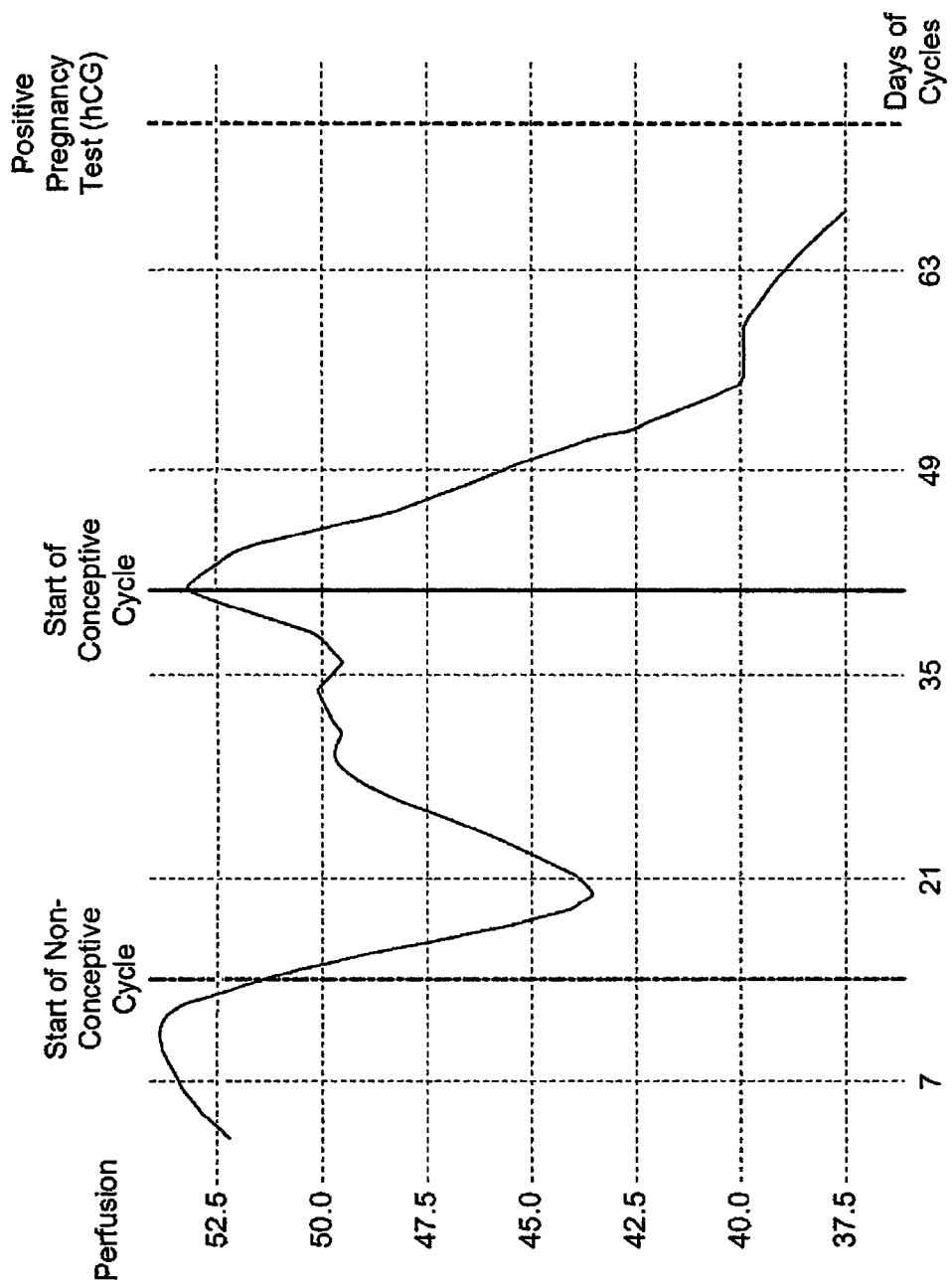
FIG. 9: shows a graph illustrating an example of the temporal course and change of the perfusion of a female human during a non-conceptive cycle and a subsequent conceptive cycle.

As illustrated in FIGS. 7-9, for a second set of physiological parameters, including the low frequency component of the heart rate variability, heart rate variability ratio and perfusion, these differences are characterized by a decreased value in the late post-ovulatory phase in the conceptive cycle (time window W'), compared to the corresponding late luteal phase of a non-conceptive cycle (time window W).

Accordingly, the processor 13 of the wearable device and/or the processor(s) 30, 40 of the computer system 3 and/or the mobile communication device 4 detect the occurrence of conception and thus the pregnancy of the female human by calculating from the physiological parameters recorded for the female user average values for the late post ovulatory phase of a cycle (time windows W, W' in FIG. 12) and comparing the average values for the late post ovulatory phase of the current cycle (time window W') to the corresponding average values calculated for the late post ovulatory phase of preceding non-conceptive cycles (time window W). The detection criteria are defined such that, if the average value for the late post ovulatory phase (time window W') of a physiological parameter from the first set shows an increase above a defined threshold (e.g. comparable to an increase as illustrated in Table 1 or a defined percentage thereof, e.g. 75%), the current cycle is identified as a conceptive cycle and a detected conception is indicated to the female user. If the average value for the late post ovulatory phase (time window W') of a physiological parameter from the second set shows decrease above a defined threshold (e.g. comparable to a decrease as illustrated in Table 1 or a defined percentage thereof, e.g. 75%), the current cycle is identified as a conceptive cycle and a detected conception is indicated to the female user. One skilled in the art will understand, that the significance of the physiological parameters may be weighted and the weighting factors may be adapted for an individual female user or for certain groups of female users.

As indicated in Table 2, a third set of physiological parameters, including the pulse rate (heart rate) and skin temperature, show a detectable difference before and after a miscarriage. Table 2 indicates these difference in absolute values for the pulse rate (heart rate) and the skin temperature together with the respective standard deviation (** significance p<0.05).

TABLE 2

| Physiological parameters | Difference in physiological parameters before and after miscarriage | Standard deviation |
|---|---|---|
| Pulse rate [beats per minute] | −1.608** | (0.799) |
| Skin temperature [C.] | −0.192** | (0.088) |

Accordingly and as defined by the detection criteria, the processor 13 of the wearable device and/or the processor(s) 30, 40 of the computer system 3 and/or the mobile communication device 4 detect the occurrence of miscarriage of the female user, by checking whether the heart rate of the female user and/or the skin temperature of the female user decreases by a defined threshold value, e.g. as indicated in Table 2 or a defined percentage thereof, e.g. 75%, after conception was detected for the female user. The difference is detected between a first average value of the respective physiological parameter in a preceding, earlier time window (before the miscarriage), as indicated by time window W1 in FIG. 13, and a second average value of the respective physiological parameter in a subsequent, later time window (after the miscarriage), as indicated by time window W2 in FIG. 13. For example, the duration of the earlier time window W1 is seven days (before the miscarriage), and the duration of the later time window W2 is five days. The two consecutive time windows W1, W2 are sliding time windows, which are moved, for example, with the current day of the current pregnancy.

Figure 10:
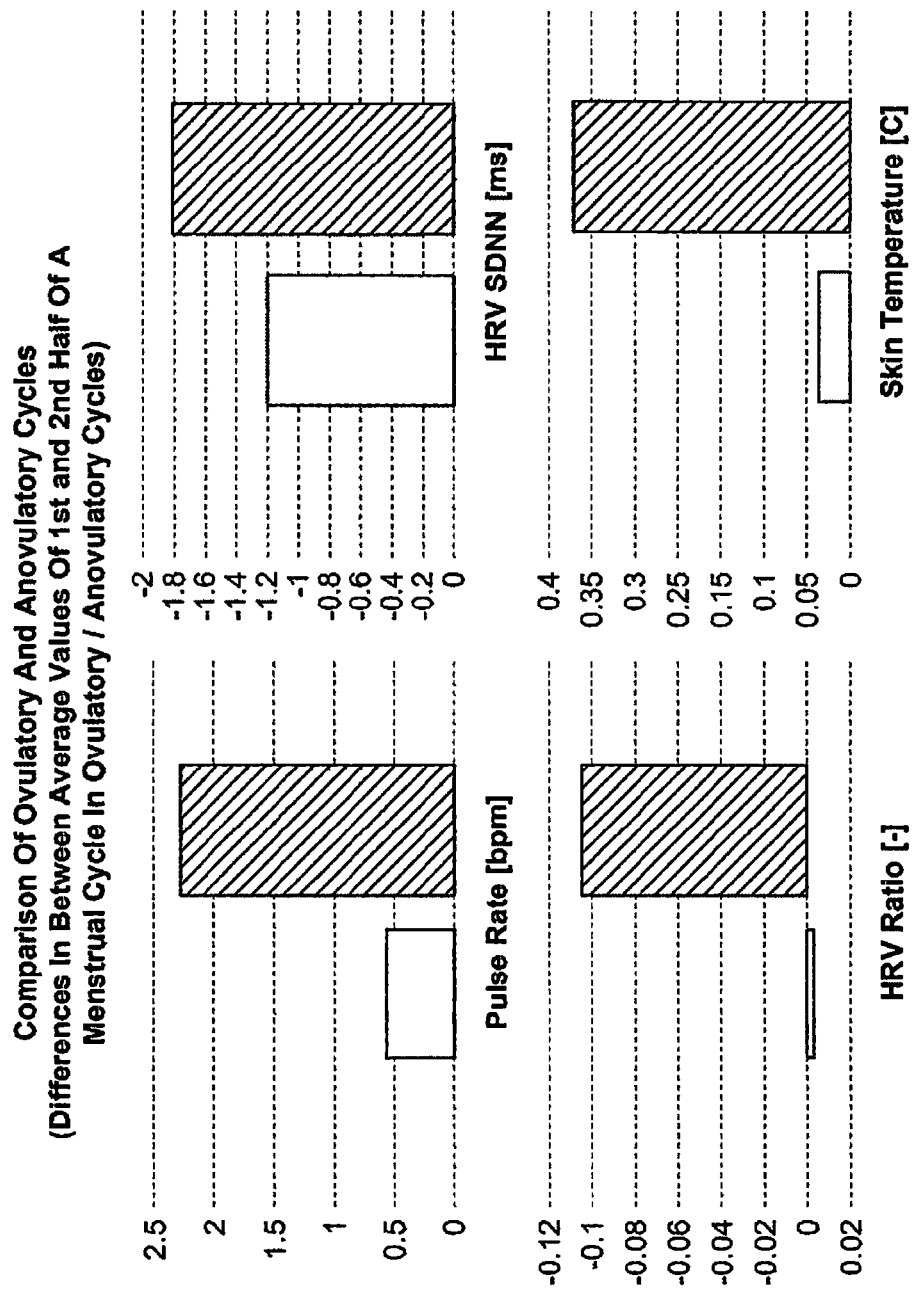
FIG. 10: shows graphs illustrating a comparison of the differences between the average values of the first half and second half of a menstrual cycle of pulse rate, standard deviation of beat-to-beat heart rate variability, heart rate variability ratio, and skin temperature of a female human in the ovulatory and anovulatory cycles.

As illustrated in FIG. 10, a fourth set of physiological parameters, including the pulse (heart) rate, heart rate variability, heart rate variability ratio and skin temperature, show a noticeably smaller variance or difference in their values during the final phase of the cycle, e.g. the last thirteen days of the cycle, as indicated by time windows W3 in FIG. 14, compared to the (preceding) other days of the cycle, as indicated by time windows W3' in FIG. 14, in anovulatory cycles than in ovulatory cycles. Table 3 shows this variation in absolute values for the pulse rate (heart rate), heart rate variability, heart rate variability ratio, and skin temperature for the final thirteen days (time window W3) of an anovulatory cycle compared to the preceding other days (rest, time window W3') of the cycle in the anovulatory cycle (ns=non-significant), and for the final thirteen days (time window W3) of an ovulatory cycle compared to the preceding other days (rest, time window W3') in the ovulatory cycle (significance *** p<0.01).

TABLE 3

| Physiological parameters | Difference physiological signals last 13 days of cycles compared to the rest of the cycle in anovulatory cycles | Difference physiological signals last 13 days of cycles compared to the rest of the cycle in ovulatory cycles |
|---|---|---|
| Pulse rate | +0.6 bpm (0.5 bpm) ns | + 2.3 bpm (0.2 bpm) *** |
| HRV SDNN | −1.2 ms (0.9 ms) ns | −1.8 ms (0.5 ms) *** |
| HRV Ratio | +0.004 (0.012) ns | −0.102 (0.013) *** |
| Skin temperature | + 0.04 C. (0.07 C.) ns | +0.354 C. (0.03 C.)*** |

Accordingly, the processor 13 of the wearable device and/or the processor(s) 30, 40 of the computer system 3 and/or the mobile communication device 4 detect an anovulatory cycle by determining the difference or variance of the average values of the physiological parameters for the final phase of the cycle, e.g. the last thirteen days, as indicated by time windows W3 in FIG. 14, compared to the average values of the physiological parameters for the preceding other days (rest) of the cycle, as indicated by time windows W3' in FIG. 14. The detection criteria are defined such that, if this difference or variance is smaller in the current cycle than the difference or variance values expected for ovulatory cycles, e.g. as indicated in Table 3 or a defined percentage thereof, e.g. 50%, the current cycle is identified as an anovulatory cycle and a detected anovulatory cycle is indicated to the female user or to a healthcare provider.

Figure 11:
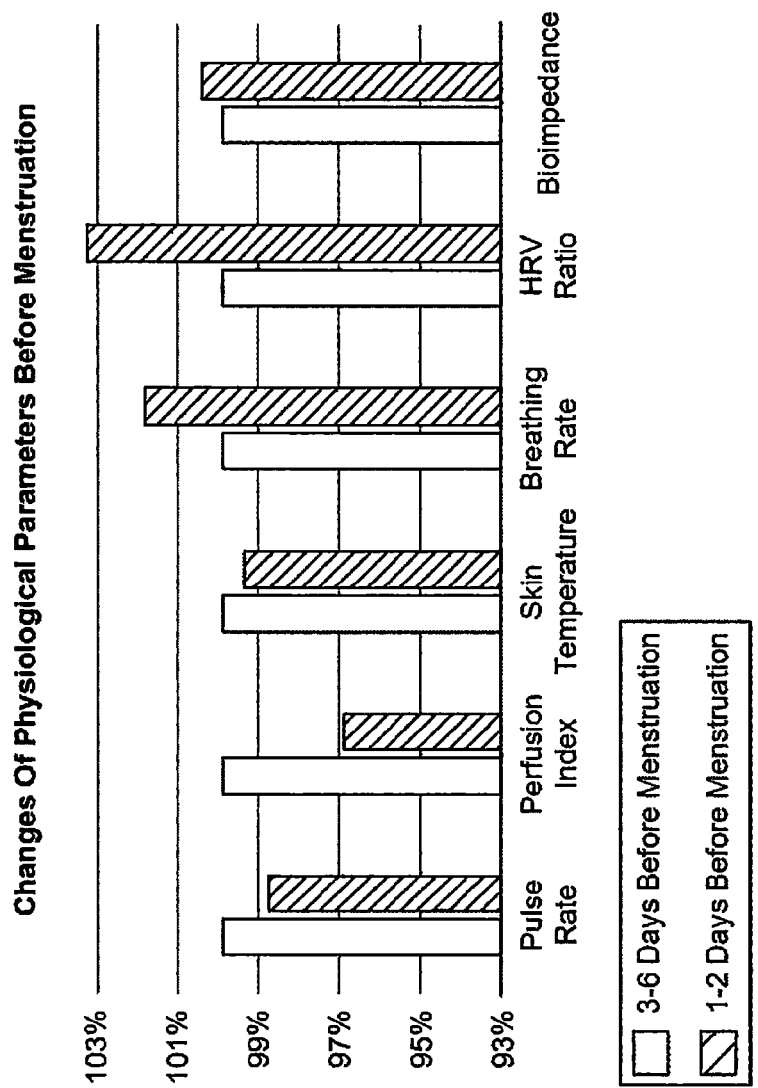
FIG. 11: shows a graph illustrating the differences of the pulse rate, perfusion index, skin temperature, heart rate variability ratio, and skin temperature of a female human in the time period of 1-2 days before menstruation compared to the time period 3-6 days before menstruation.

As illustrated in FIG. 11, a fifth set of physiological parameters, including the pulse (heart) rate, perfusion index, skin temperature, breathing rate, heart rate variability ratio and bioimpedance show a detectable difference or variation in the days before menstruation.

Table 4 indicates these difference in absolute values for pulse rate (heart rate), perfusion index, skin temperature, breathing rate, heart rate variability ratio, and bioimpedance for the three to six days before menstruation compared to the one to two days before menstruation.

TABLE 4

| Physiological parameters | 3-6 days before menstruation | 1-2 days before menstruation |
|---|---|---|
| Pulse rate | 58.2 | 57.5 |
| Perfusion index | 35.8 | 34.7 |
| Skin temperature | 35.6 | 35.4 |
| Breathing rate | 15.5 | 15.8 |
| HRV Ratio | 0.62 | 0.64 |
| Bioimpedance | 2988 | 3003 |

Accordingly, the processor 13 of the wearable device and/or the processor(s) 30, 40 of the computer system 3 and/or the mobile communication device 4 predict a menstruation by calculating from the physiological parameters recorded for the female user average values for two consecutive time windows, e.g. a first average value for a preceding, earlier time window of four days, as indicated by time window W4 in FIG. 15, and a second average value for a subsequent, later time window of two days, as indicated by time window W5 in FIG. 15, and by checking whether the respective physiological parameter(s) shows a variation from the preceding earlier time window W4 to the subsequent later time window W5, meeting a defined threshold criteria or value, e.g. a difference as indicated in Table 4 or a defined percentage thereof, e.g. 75%. The two consecutive time windows W4, W5 are sliding time windows, which are moved, for example, with the current day of the current cycle. For a first subgroup of the fifth set of physiological parameters, including the pulse (heart) rate, perfusion index, and skin temperature, the defined detection and threshold criteria relate to a decrease of the respective physiological parameter from the preceding earlier time window W4 to the subsequent later time window W5. For a second subgroup of the fifth set of physiological parameters, including breathing rate, heart rate variability ratio and bioimpedance, the defined detection and threshold criteria relate to an increase of the respective physiological parameter from the preceding earlier time window W4 to the subsequent later time window W5. If the detection criteria is met, the upcoming menstruation is indicated to the female user.

It should be noted that, in the description, the sequence of the steps has been presented in a specific order, one skilled in the art will understand, however, that the computer program code may be structured differently and that the order of at least some of the steps could be altered, without deviating from the scope of the invention.

The invention claimed is:

1. An electronic system for detecting a pregnancy related events to a pregnancy of a female human, the pregnancy related events consisting at least one of: ovulation, conception, or miscarriage, the system consisting of:
a wearable device including a sensor system configured to be worn in contact with skin of the female human and to measure one or more physiological parameters of the female human;
a processor configured to:
receive from the female human an entry which indicates a time of an actual menses, and to determine time windows, for analyzing the one or more physiological parameters of the female human, using the time of the actual menses; and
detect the pregnancy related events by comparing first physiological parameters of the female human with second physiological parameters of the female human, wherein the first physiological parameters are determined and recorded for a first one of the time windows and the second physiological parameters are determined and recorded for a second one of the time windows; and
indicate to the female human the pregnancy related events when the comparison of the first physiological parameters and the second physiological parameters meets defined detection criteria, and wherein the processor is configured to:
detect occurrence of the conception and to indicate to the female human a pregnancy status when a first set of the second physiological parameters of the female human, determined and recorded in the second one of the time windows in a second final phase of a second cycle, has a higher value than the first set of the first physiological parameters of the female human, determined and recorded in the first one of the time windows in a first final phase of a first cycle, by a defined threshold value, the first set of the first and the second physiological parameters of the female human including at least one of: a breathing rate of the female human, a heart rate of the female human, or a skin temperature of the female human, and wherein the processor is configured to set a starting time of the first one of the time windows in the first final phase of the first cycle to ten days after the ovulation in the first cycle, and to set a starting time of the second one of the time windows in the second final phase of the second cycle to ten days after the ovulation in the second cycle,
detect the miscarriage and to indicate to the female human the miscarriage when a third set of the second physiological parameters of the female human, determined and recorded in the second one of the time windows, after the detection of the occurrence of the conception, shows a decreasing value by the defined threshold value from the third set of the first physiological parameters of the female human, determined and recorded in the first one of the time windows preceding the second one of the time windows, the third set of the first and the second physiological parameters of the female human including at least one of: the heart rate of the female human or the skin temperature of the female human, and detect an ovulatory cycle and to indicate to the female human the ovulatory cycle when a fourth set of the second physiological parameters of the female human, determined and recorded in the second one of the time windows in a current final phase of a current cycle, shows a variation to the first physiological parameters, determined and recorded in the current cycle for the first one of the time windows preceding the second one of the time windows in the current final phase of the current cycle, which the variation is greater by the defined threshold value than the variation expected for an anovulatory cycle, the fourth set of the first and the second physiological parameters of the female human including at least one of: the heart rate of the female human, a standard deviation of beat to beat of a heart rate variability, a heart rate variability ratio, a heart rate variability parameter, or the skin temperature of the female human.

2. The electronic system of claim 1, wherein the processor is further configured to receive from the female human a first entry which indicates an actual occurrence of one of the pregnancy related events for the female human, and to adapt the defined detection criteria for the pregnancy related events indicated by the female human, using the first and the second physiological parameters determined and recorded for the female human.

3. The electronic system of claim 1, wherein the processor is further configured to calculate average values of the first and the second physiological parameters of the female human, determined and recorded for the first one of the time windows and for the second one of the time windows, and to compare the average values of the first physiological parameters calculated for the first one of the time windows to the average values of the second physiological parameters, calculated for the second one of the time windows.

4. The electronic system of claim 1, wherein the sensor system is configured to determine at least one of: the breathing rate of the female human, the heart rate of the female human, the skin temperature of the female human, the heart rate variability parameter of the female human, a skin bioimpedance of the female human, or a perfusion of the female human; and the processor is configured to detect the pregnancy related events by comparing at least one of: the breathing rate of the female human, the heart rate of the female human, the skin temperature of the female human, the heart rate variability parameter of the female human, the skin bioimpedance of the female human, or the perfusion of the female human, determined and recorded for the first one of the time windows, respectively with at least one of: the breathing rate of the female human, the heart rate of the female human, the skin temperature of the female human, the heart rate variability parameter of the female human, the skin bioimpedance of the female human, or the perfusion of the female human, determined and recorded for the second one of the time windows, and to indicate to the female human the pregnancy related events when the comparing meets the defined detection criteria.

5. The electronic system of claim 1, wherein the processor is further configured to use the time of the actual menses, indicative of the first cycle, to determine a first time for the second cycle following the first cycle; and to detect the pregnancy related events by comparing the first physiological parameters of the female human, determined and recorded for the first one of the time windows in the first cycle, with the second physiological parameters of the female human, determined and recorded for the second one of the time windows in the second cycle, and to indicate to the female human the pregnancy related events when comparing the first and the second physiological parameters meets the defined detection criteria.

6. The electronic system of claim 1, wherein the processor is configured to detect the occurrence of the conception and to indicate to the female human the pregnancy status when a second set of the second physiological parameters of the female human, determined and recorded in the second one of the time windows in the second final phase of the second cycle, has a lower value than the second set of the first physiological parameters of the female human, determined and recorded in the first one of the time windows in the first final phase of the first cycle, by the defined threshold value, the second set of the first and the second physiological parameters of the female human including at least one of: a low frequency component of the heart rate variability of the female human, the heart rate variability ratio of the female human, or a perfusion of the female human.

7. The electronic system of claim 1, wherein the processor is further configured to determine an expected menstruation and to indicate to the female human the expected menstruation, when a fifth set of the second physiological parameters of the female human, determined and recorded in the second one of the time windows in a non-conceptive cycle, shows defined deviation from values of the fifth set of the first physiological parameters of the female human, determined and recorded in the first one of the time windows preceding the second one of the time windows of the non-conceptive cycle, the fifth set of the first and the second physiological parameters of the female human and the defined deviation including at least one of: the heart rate of the female human showing a decreasing value, a perfusion index of the female human showing a decreasing value, the skin temperature of the female human showing a decreasing value, the breathing rate of the female human showing an increasing value, the heart rate variability ratio of the female human showing an increasing value, or a bio-impedance of the female human showing an increasing value.

8. The electronic system of claim 1, wherein the electronic system further comprises a data store, and the processor is configured to store the one or more physiological parameters measured by the sensor system, and to detect the pregnancy related events, using the one or more physiological parameters of the female human stored during a plurality of cycles.

9. The electronic system of claim 1, wherein the processor is arranged in the wearable device and configured to detect the pregnancy related events, using the one or more physiological parameters measured by the sensor system of the wearable device.

10. The electronic system of claim 1, wherein the processor is arranged in an external system, separated from the wearable device, the wearable device further comprises a communication transmitter configured to transmit the one or more physiological parameters measured by the sensor system of the wearable device to the external system, and the processor is configured to detect the pregnancy related events using the one or more physiological parameters received from the wearable device.

11. A method of detecting a pregnancy related events of a female human, the pregnancy related events consisting at least one of: ovulation, conception, or miscarriage, the method consisting of:

receiving in a processor from a sensor system of a wearable device one or more physiological parameters of the female human;

receiving in the processor from the female human an entry indicating a time of an actual menses of a first cycle;

determining, by the processor, time windows, for analyzing the one or more physiological parameters of the female human, using the time of the actual menses;

detecting the pregnancy related events by the processor comparing first physiological parameters of the female human with second physiological parameters of the female human, wherein the first physiological parameters are determined and recorded for a first one of the time windows and the second physiological parameters are determined and recorded for a second one of the time windows; and indicating, by the processor, to the female human the pregnancy related events when the comparison of the first physiological parameters and the second physiological parameters meets defined detection criteria, and wherein the processor is configured to:

detect occurrence of the conception and to indicate to the female human a pregnancy status when a first set of the second physiological parameters of the female human, determined and recorded in the second one of the time windows in a second final phase of a second cycle, has a higher value than the first set of the first physiological parameters of the female human, determined and recorded in the first one of the time windows in a first final phase of a first cycle, by a defined threshold value, the first set of the first and the second physiological parameters of the female human including at least one of: a breathing rate of the female human, a heart rate of the female human, or a skin temperature of the female human, and wherein the processor is configured to set a starting time of the first one of the time windows in the first final phase of the first cycle to ten days after the ovulation in the first cycle, and to set a starting time of the second one of the time windows in the second final phase of the second cycle to ten days after the ovulation in the second cycle, detect the miscarriage and to indicate to the female human the miscarriage when a third set of the second physiological parameters of the female human, determined and recorded in the second one of the time windows, after the detection of the occurrence of the conception, shows a decreasing value by the defined threshold value from the third set of the first physiological parameters of the female human, determined and recorded in the first one of the time windows preceding the second one of the time windows, the third set of the first and the second physiological parameters of the female human including at least one of: the heart rate of the female human or the skin temperature of the female human, and detect an ovulatory cycle and to indicate to the female human the ovulatory cycle when a fourth set of the second physiological parameters of the female human, determined and recorded in the second one of the time windows in a current final phase of a current cycle, shows a variation to the first physiological parameters, determined and recorded in the current cycle for the first one of the time windows preceding the second one of the time windows in the current final phase of the current cycle, which the variation is greater by the defined threshold value than the variation expected for an anovulatory cycle, the fourth set of the first and the second physiological parameters of the female human including at least one of: the heart rate of the female human, a standard deviation of beat to beat of a heart rate variability, a heart rate variability ratio, a heart rate variability parameter, or the skin temperature of the female human.

12. A computer program product consisting of a non-transitory computer readable medium having stored thereon computer program code configured to control one or more processors of a computerized system, such that the computerized system performs steps of:

receiving from a sensor system of a wearable device one or more physiological parameters of a female human;

receiving from the female human an entry indicating a time of an actual menses of a first cycle;

determining time windows, for analyzing the one or more physiological parameters of the female human, using the time of the actual menses;

detecting a pregnancy related events by the one or more processors comparing first physiological parameters of the female human with second physiological parameters of the female human, wherein the first physiological parameters are determined and recorded for a first one of the time windows and the second physiological parameters are determined and recorded for a second one of the time windows; and indicating, by the one or more processors, to the female human the pregnancy related events when the comparison of the first physiological parameters and the second physiological parameters meets defined detection criteria, and wherein the one or more processors is configured to:

detect occurrence of a conception and to indicate to the female human a pregnancy status when a first set of the second physiological parameters of the female human, determined and recorded in the second one of the time windows in a second final phase of a second cycle, has a higher value than the first set of the first physiological parameters of the female human, determined and recorded in the first one of the time windows in a first final phase of a first cycle, by a defined threshold value, the first set of the first and the second physiological parameters of the female human including at least one of: a breathing rate of the female human, a heart rate of the female human, or a skin temperature of the female human, and wherein the one or more processors is configured to set a starting time of the first one of the time windows in the first final phase of the first cycle to ten days after ovulation in the first cycle, and to set a starting time of the second one of the time windows in the second final phase of the second cycle to ten days after the ovulation in the second cycle, detect a miscarriage and to indicate to the female human the miscarriage when a third set of the second physiological parameters of the female human, determined and recorded in the second one of the time windows, after the detection of the occurrence of the conception, shows a decreasing value by the defined threshold value from the third set of the first physiological parameters of the female human, determined and recorded in the first one of the time windows preceding the second one of the time windows, the third set of the first and the second physiological parameters of the female human including at least one of: the heart rate of the female human or the skin temperature of the female human, and detect an ovulatory cycle and to indicate to the female human the ovulatory cycle when a fourth set of the second physiological parameters of the female human, determined and recorded in the second one of the time windows in a current final phase of a current cycle, shows a variation to the first physiological parameters, determined and recorded in the current cycle for the first one of the time windows preceding the second one of the time windows in the current final phase of the current cycle, which the variation is greater by the defined threshold value than the variation expected for an anovulatory cycle, the fourth set of the first and the second physiological parameters of the female human including at least one of: the heart rate of the female human, a standard deviation of beat to beat of a heart rate variability, a heart rate variability ratio, a heart rate variability parameter, or the skin temperature of the female human.

\* \* \* \* \*